Nov. 17, 1953 L. F. POLK Re. 23,739

GRINDING MACHINE WITH CRUSH-DRESSING ATTACHMENT

Original Filed June 4, 1945 2 Sheets-Sheet 1

INVENTOR
Louis F. Polk
BY
Edward J. Norp
ATTORNEY

GRINDING MACHINE WITH CRUSH-DRESSING ATTACHMENT
Original Filed June 4, 1945 2 Sheets-Sheet 2
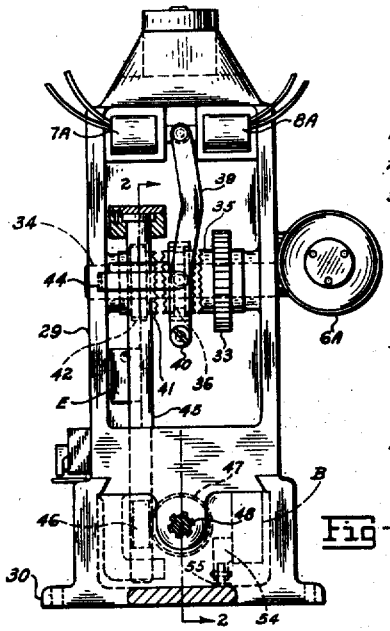
Fig-5
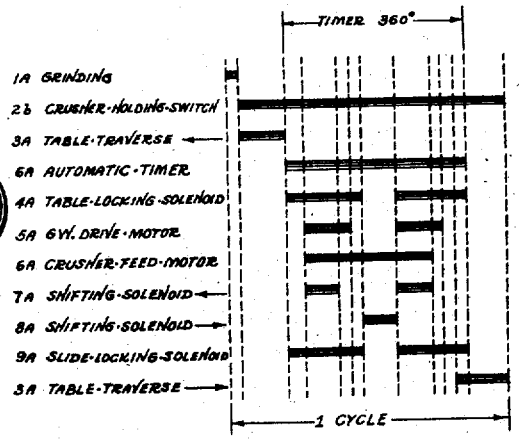
Fig-7
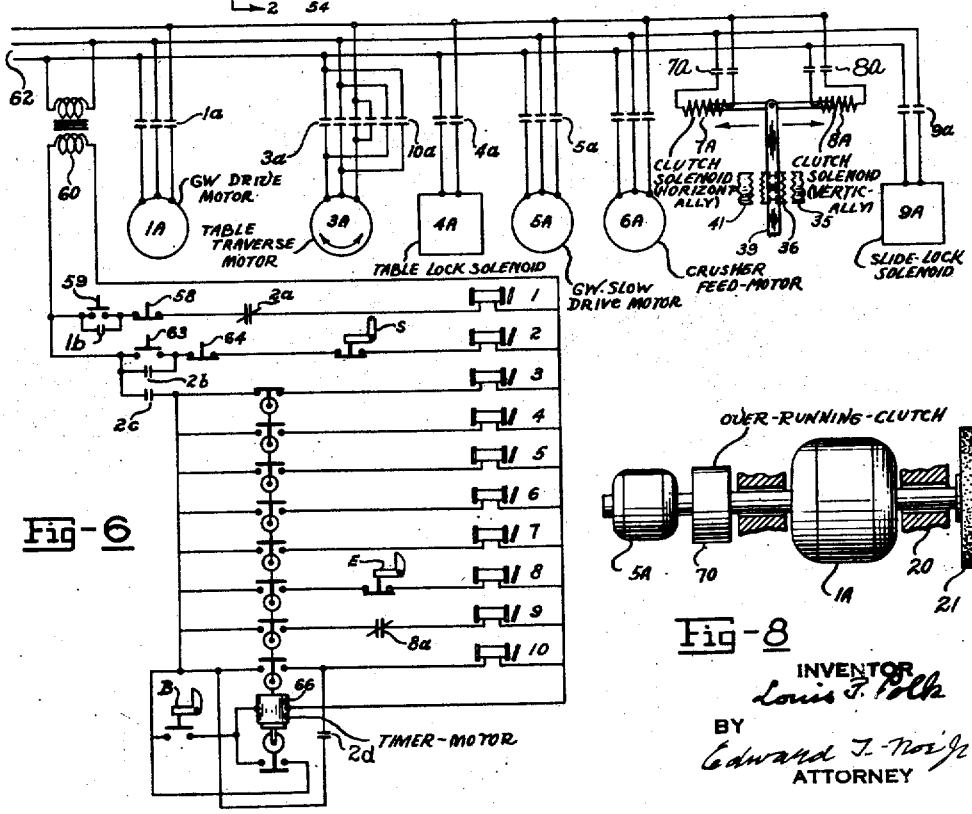
Fig-6
Fig-8
INVENTOR
Louis F. Polk
BY
Edward F. Roy Jr
ATTORNEY Reissued Nov. 17, 1953

Re. 23,739

UNITED STATES PATENT OFFICE 23,739

GRINDING MACHINE WITH CRUSH-DRESSING ATTACHMENT

Louis F. Polk, Dayton, Ohio, assignor to The Sheffield Corporation, Dayton, Ohio, a corporation of Ohio Original No. 2,477,418, dated July 26, 1949, Serial No. 599,237, June 4, 1945. Application for reissue December 23, 1952, Serial No. 327,709

14 Claims. (Cl. 125—11)

Matter enclosed in heavy brackets [ ] appears in the original patent but forms no part of this reissue specification; matter printed in italics indicates the additions made by reissue.

This invention relates to grinding machines and more particularly to means for forming or surfacing the grinding wheel of such a machine, the invention being applicable to form grinders or surface grinders or the like.

One object of the invention is the provision, in a grinding machine, of a grinding wheel truing device including a plurality of rotatable crushers adapted for operation on the grinding wheel, one of the crushers shaping the grinding wheel to approximately the desired shape, while the second crusher gives the final or accurate form as desired.

Another object of the invention is the provision, in a grinding machine, of a grinding wheel truing device, having a pair of crusher wheels carried for simultaneous movement by holding mechanism whereby the crushers can be moved in one direction to bring one of them into pressure engagement with the grinding wheel, and then be moved in a second direction so that the first crusher is released from the grinding wheel and the second crusher is brought into pressure engagement with the wheel.

Another object is the provision of a grinding wheel truing device having a movable slide mechanism on which a pair of crushers are arranged, the crushers being so moved that one of them may be brought into engagement with the grinding wheel and produce a crushing operation on the wheel for a desired time interval, and at the end of that interval, the crushers are automatically moved in a direction at an angle to the direction in which they first moved, to bring the second crusher into pressure engagement with the wheel.

*Another object of the invention is the provision, in a grinding machine, of a grinding wheel trueing device including means for relatively moving a grinding wheel and a crusher means toward one another in a series of automatically coordinated sequential movements in directions substantially transverse of one another.*

Another object is the provision of a crusher mechanism for a surface grinder or the like, in which a crusher supporting slide is slidably arranged on a crusher supporting base and is yielding on that base when the base is moved to bring a crusher into an engagement with the grinding wheel, the construction being such that after a predetermined yielding movement of the crusher slide, a solenoid lock is automatically energized to hold the crusher slide on the base and a further controlled movement of the crusher slide then takes place throughout a time interval determined by a suitable timing mechanism.

Other objects and advantages of the invention will be apparent from the following description, the appended claims, and the accompanying drawing, in which, Fig. 1 is a perspective view of a grinding machine showing the adaptation of the invention to surface grinders, or the like;

Fig. 5 is a vertical section on line 5—5 of Fig. 2;

Fig. 6 is a wiring diagram;

Fig. 7 is a timing chart showing the sequential operations that take place; and

Fig. 8 is a diagrammatic showing of how the grinding wheel is driven from the power drive motor or from the auxiliary slow speed drive motor.

Figure 1:
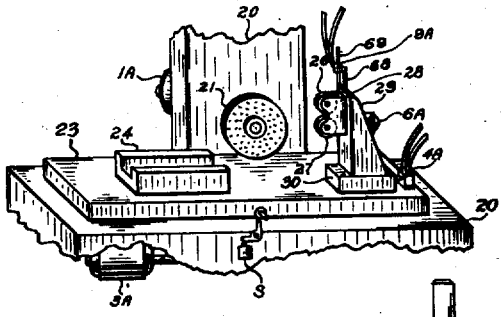
Figure 4:
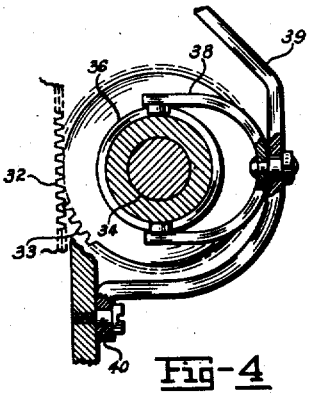
Fig. 4 is a vertical section on the line 4—4 of Fig. 3.

Referring more particularly to the drawing, in which the same reference numerals are used to designate like parts in the different views, 20 generally represents the frame structure of a grinding machine having a rotatable grinding wheel 21. The grinding machine may be of the type having a movable table 23 that reciprocates back and forth and carries the work past the grinding wheel, or it may be of the character more particularly used in grinding threads or forms on workpieces held between centers. Any suitable mechanism such as a reversible motor 3A can be used to move the work supporting table 23 back and forth below the grinding wheel, and carry the work arranged in a suitable holder 24. At the end of the grinding operation, or any other time it might be desired to true the surface of the grinding wheel, the table 23 is moved to the left beyond its normal travel stroke and brought up to a predetermined position in which the grinding wheel is spaced only a little distance from the truing crusher.

In accordance with the present invention, a plurality of rotatable crushers are employed to form or true the grinding wheel to its intended shape. One of these crushers gives a preliminary truing action as the grinding wheel and the crusher are rotated in pressure engagement with one another at suitably slow speed. The first crushing operation gives an approximation to the required shape, the exact shape of the grinding wheel desired being produced by the second crushing operation under the action of the second crusher while the grinding wheel and its crusher are rotated in pressure engagement with one another. The two crushers can have approximately the same form and shape, if desired, and as wear takes place on the first crusher because of its use through longer time periods, any change in its shape will be relatively unimportant, since the second crusher will give the exact shape desired and will maintain its form over long periods of time, not being called upon to perform the major portion of the crushing operation. If desired, a portion of the formations or curves may be given to the grinding wheel by the first crusher and other portions of the grinding wheel subsequently formed by the second crusher. In either case, the two crushers act to complement one another in producing the exact shape desired on the grinding wheel periphery.

Figure 2:
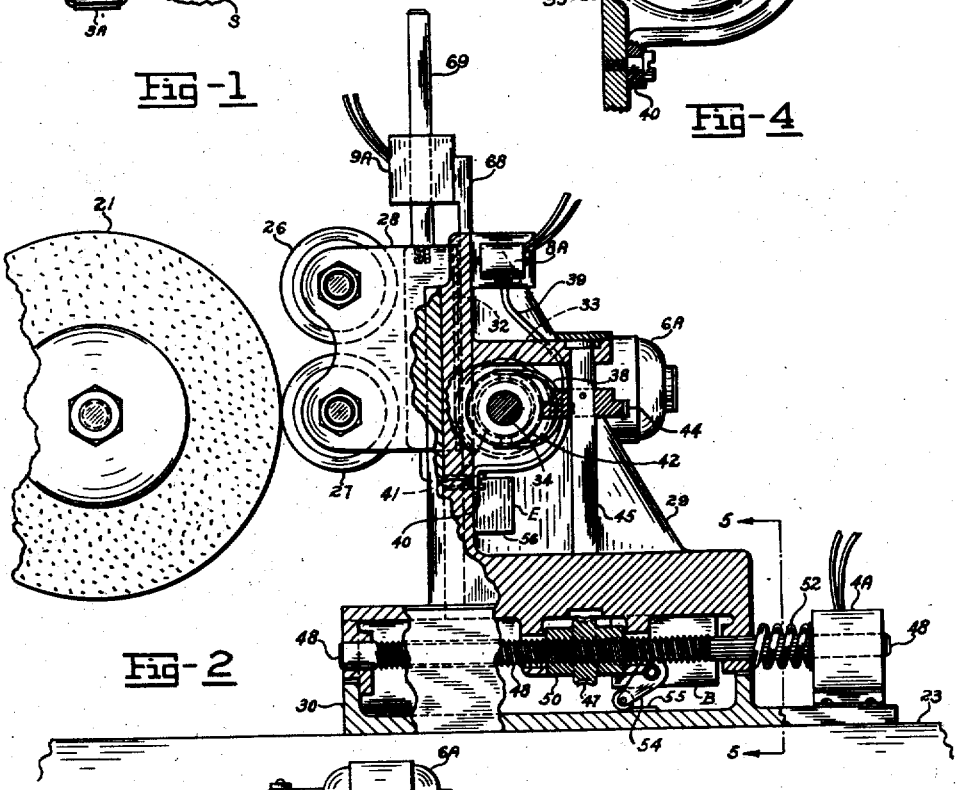
Fig. 2 is a side elevation, partly in section, showing the relationship between the grinding wheel and the crusher adjusting mechanism.
Figure 3:
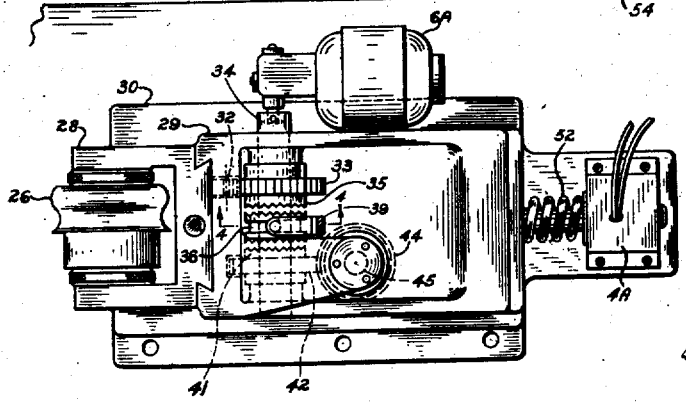
Fig. 3 is a top plan view of the crusher adjusting mechanism.

As shown in Fig. 2, the crusher that first acts on the grinding wheel is shown at 26, and the second crusher is illustrated at 27. These two crushers are rotatably supported for free movement on arbors carried by the holder 28, which is slidably carried for vertical movement on a crusher table slide 29. This slide operates horizontally on the crusher base 30 which is fixed on the work carrying table 23 of the machine. Normally, at the start of a cycle of operation, the holder 28 is in a lowered position so that the axis of the crusher 26 is horizontally arranged from the axis of the grinding wheel 21, with the crusher slightly spaced for the grinding wheel. This is the position at which the table 23 is stopped and held at the end of a normal grinding operation on the work. Movements of the crusher then take place horizontally and vertically by means of the mechanism that will now be described.

The holder 28 is vertically adjustable along the slide 29 by means of a rack 32 on the holder and a spur gear 33 which is rotatably arranged on a shaft 34 carried by the crusher slide 29. The gear 33 carries a clutch face 35 so it may be coupled to a rotatable clutch collar 36 which is keyed to the shaft 34. The shaft is driven by an electric motor 6A on the slide. The clutch collar 36 is automatically controlled by a yoke 38 moved by an arm 39 pivoted at 40 and operated in one direction or the other by solenoids 7A and 8A as shown in Fig. 5. [By closing] *When* the solenoid 8A[,] *is closed* the shaft 34 will be coupled to the gear 33 and the holder 28 will be raised. When the solenoid 7A is energized, the shaft 34 is coupled to clutch disc 41 which is fixed on a gear 42 meshing with gear 44 on a vertical shaft 45. On the lower end of this shaft 45 is a worm 46 turning a worm wheel 47. This worm wheel is threaded on a non-rotatable feed shaft 48 splined in the slide 29, the worm wheel being held against axial movement with respect to the [crusher base] [30] *slide 29*. In this way, the operation of the motor 6A can drive the feed nut 50 on shaft 48 at a regular predetermined slow speed and cause a predetermined feed movement of the crusher slide toward the grinding wheel. This slide movement takes place if the feed shaft 48 is held against axial movement with respect to the base 30, and the shaft is so held, at times, by means of an electric securing means such as a magnetic lock 4A, which holds the shaft 48 securely to the base 30. When this magnetic lock is not energized, relative movement of the crusher slide 29 toward the right as viewed in Fig. 2 is restrained only by a spring 52 interposed between the end of the slide 29 and [a flange on shaft 48 contacting] the magnetic lock. It will be understood that as the work supporting table 23 is moved to the left as viewed in Fig. 2, the crusher 26 in its lowered position will engage the grinding wheel, and as this left-hand movement of the table continues, the spring 52 will be compressed, slide 29 being forced to the right with respect to the crusher base 30. After a predetermined relative motion has taken place in this way, a switch arm 54 of a limit switch B carried by the crusher slide 29 will ride up an abutment 55 on the base 30 and control this limit switch, the effect of which will be presently described. There is another limit switch E carried by the crusher table slide 29 in such position as to be operated by the holder 28 when the holder has been raised to a predetermined position in which the crusher 27 is horizontally opposite the grinding wheel 21.

During the normal grinding operation, the grinding wheel 21 is rotated at comparatively high speed by a power drive motor 1A a portion of which is shown in Fig. 1, the motor being also diagrammatically illustrated in Fig. 6, where it is shown connected through the switch 1a which is closed when the relay 1 is closed. The relay 1 is arranged in circuit with a normally closed switch 2a connected through a stop switch 58 and start switch 59 to the secondary 60 of a transformer that is supplied with current from a suitable power source 62. The switch 59 is *momentarily* closed in carrying out a normal grinding operation [but] *and a switch 1b actuated by relay 1 maintains a circuit around it. The circuit through the relay 1* should be open during the crushing operation. For crushing, a switch 63 is closed and this connects through a stop switch 64 and through a normally closed limit switch S to a relay 2. Switch S is carried by the frame 20 and is temporarily opened by a lug on the table 23 as will be later described. The relay 2, when energized, opens switch 2a to make sure the power drive motor 1A will not operate. Relay 2 also closes [two] switches 2b, [and] 2c[, one of which] *and 2d. Switch 2b* is a holding switch around the start switch 63 [and the other]. *Switch 2c* connects one side of the supply line to a series of cam operated switches and relay coils 3 to 10 inclusive *and switch 2d completes a circuit around the cam operated switch associated with relay* 10 *for purposes later described.* Switch 2c also connects an automatic timer motor 66, through the limit switch B. The relay coils 3 to 10 each are in series with switches controlled by cams operated by the timing motor 66 so as to give the desired sequence of operation as illustrated in the timing diagram shown in Fig. 7.

The relay coil 8 is in series with the limit switch E which is controlled by the vertical movement of holder 28 as previously mentioned. Relay 8 is effective, when it is energized, to open the normally closed switch 8a in series with relay 9. A switch 3a operated by relay 3 supplies power to the reversible electric motor 3A which traverses the work table 23. Switch 10a, controlled by relay 10, supplies power for the reverse operation of this motor. Switch 4a controlled by relay 4 energizes the crusher table slide lock 4A. Switch 5a closes when relay 5 is energized and supplies power to an auxiliary drive motor 5A, which operates through a clutch 70 to turn the grinding wheel 21 at comparatively slow speed during the crushing operation, the main power motor 1A being de-energized under these conditions. The clutch 70 is an over-running clutch of any suitable character so designed that the shaft carrying the grinding wheel is turned when the auxiliary drive motor 5A is operating, at comparatively slow speed; the motor 5A then turning the main power drive motor 1A slowly. The clutch, however, overruns when the main power drive motor 1A is energized and turns at comparatively high speed to turn the grinding wheel rapidly. When the main drive motor 1A turns the grinding wheel at high speed, the overrunning clutch permits the slow speed drive motor 5A to remain stationary. When the motor 5A is running the grinding wheel will be turned at a peripheral speed of about 300 feet a minute, suitable for a crushing operation. Switch 9a when energized by relay 9 energizes the crusher holder lock 9A which is supported on a bracket 68 on the crusher table slide 29. When this is energized it electrically locks the rod 69 which is fixed on the holder 28 so as to secure the holder firmly to the slide 29.

The sequence of operations in automatically crushing the grinding wheel first with the preliminary crusher 26 and then with the finishing crusher 27 is as follows:

After a predetermined number of passes across the work, the table 23 moves over to a predetermined work loading position so that the grinding wheel is adjacent to the crushers. When a crushing operation is desired, it is initiated from this position by closing the switch 63, *the switch S being closed and untripped,* the following operation taking place:

Relay 2 is energized, opening switch 2a so as to block out the normal grinding motor 1A. At the same time holding switch 2b is closed around the starting switch 63, [and] the normally open switch 2c is closed in series with the relay 3 *and switch 2d is closed.* Energizing relay 3 closes switch 3a and starts the traverse motor 3A for the table 23 so the crusher is moved over towards the grinding wheel.

As the crusher contacts the grinding wheel a differential movement of the crusher table slide 29 and the crusher base 30 takes place, spring 52 being compressed. This movement first closes the limit switch B which sets the automatic timer motor 66 in operation. When the timer is started, the traverse of table 23 is de-energized by opening the relay 3 through its cam operated control switch. The crusher table lock 4A is energized locking the shaft 48 to the crusher base. The crusher holder lock 9A is also energized, holding the crusher roll 26 horizontally opposite the grinding wheel. The timing motor 66 then closes the relays 5 and 6, thus energizing the auxiliary drive motor 5A for the grinding wheel and energizing the crusher adjusting motor 6A. At the same time, the shifting solenoid 7A is energized *to shift the clutch collar 36 to couple shaft 34 to the clutch disc 41 so as to drive shaft 45 and* [to engage the clutch collar with the shaft 45 so as to] turn the worm wheel 47. This initiates a slow positive feed of the crusher in a horizontal direction, forcing the crusher into the grinding wheel as the feed nut is turned.

After a predetermined amount of feed has taken place, the relay 7 *is de-energized, switch 7a is opened* and shifting solenoid 7A [are] *is* de-energized by the cam that controls the relay 7, thus [shifting] *allowing* the clutch disc *to shift* to a neutral position and stopping the crusher feed. *Any desired means can be used to move the clutch disc to an intermediate position, for example, as illustrated the contour of the teeth*

*on the clutch faces is such as to cam the disc to a neutral position when the solenoids are de-energized.* After sufficient time has elapsed for the grinding wheel to make about two revolutions with the crusher feed stopped, the relay 5 is de-energized by its cam operated switch, stopping the auxiliary grinding wheel drive motor 5A. After enough time has then elapsed for the grinding wheel to stop rotating, the locking solenoid 4A is de-energized, the holder locking solenoid 9A is de-energized and the shifting solenoid 8A is energized. This moves the clutch disc so that the crusher holder 26 will be raised thus bringing the crusher roll 27 into contact with the grinding wheel. This is the position of the part shown in Fig. 2. As crusher 27 engages the grinding wheel, the spring 52, which expanded as crusher 26 moved away, will be contracted again as the effective diameters of the two crushers is approximately the same.

When the crusher 27 reaches a position in horizontal alignment with the grinding wheel, the limit switch E is opened, *de-energizing relay 8 and opening the switch 8a* breaking the [holding] circuit of the shifting solenoid 8A. At the same time the shifting solenoid 7A is energized, thus [energizing] *moving* the clutch disc to couple the shaft 34 to the feed screw nut 47. This causes a positive feed of the crusher roll into the grinding wheel, since the magnetic locking solenoid 4A is closed again by the cam switch. The cam switch for the slide locking solenoid 9A on the automatic timer is also closed during the time the crusher holder is being raised but cannot energize the slide locking solenoid 9A because of the open electric switch 8a opened by the energized relay 8. Therefore, when the limit switch E is opened, breaking the circuit through the relay 8, the switch 8a is closed, completing the circuit through relay 9 and causing the simultaneous energization of solenoid 9A while the shifting solenoid 8A is de-energized. At the same time, the auxiliary drive motor 5A for the grinding wheel is energized and the grinding wheel starts to rotate slowly.

After a predetermined amount of feed of the crusher slide by the crusher adjusting motor 6A energized through the closed relay 6, the motor 6A is automatically de-energized by the automatic timer which opens the circuit through the relay 6. At the same time the shifting solenoid 7A is de-energized to [disengage] *release* the clutch disc and [shift it] *allowes its movement* to a neutral position.

After enough time has taken place for the grinding wheel to make about two or three revolutions with the crusher feed inoperative, the grinding wheel auxiliary drive motor 5A is de-energized by de-energizing the relay 5. Then after enough time has elapsed for the grinding wheel to come to a complete stop, the table traverse motor 3A is started by the automatic timer closing the circuit through the relay 10 closing switch 10a, and the table then moves from the grinding wheel to retract the crushers horizontally to the loading position of the table 23.

While the table of the grinder is being moved to the right, as just mentioned, the slide locking solenoid and the holder locking solenoid 4A and 9A are de-energized and the automatic timer completes its cycle of operations and interrupts its own circuit. When locking solenoid 9A de-energizes, the holder descends by the force of gravity until it is stopped in lowered position with crusher 26 opposite the grinding wheel. Even though the timer has completed its operation and the cam switch for the table traverse controlling relay 10 has been opened, a circuit is completed through the relay 10 around its cam operated switch *through switch 2d* until the table 23 reaches its original position, when the *relay 2 is de-energized* [holding circuit 2a is interrupted] by the tripping of the limit switch S operated by the table 23, thus completing the crushing cycle.

While the form of apparatus herein described constitutes a preferred embodiment of the invention in a form applicable to a grinding machine such as a surface grinder, it is to be understood that the invention is not limited to this precise form of apparatus, and that changes may be made therein without departing from the scope of the invention which is defined in the appended claims.

What is claimed is:

1. A grinding machine having a frame and a grinding wheel rotatably mounted thereon, a pair of rotatable crushers sequentially operable on the grinding wheel to true the surface of the wheel, a common holder [for] *carrying* said crushers, a slide on which said holder is mounted, a slide connection between said holder and slide and a slide connection between said slide and frame, means including one of said slide connections for moving said holder to adjust one of the crushers relatively to the grinding wheel for crushing the grinding wheel to the approximate form desired, and means including the other of said slide connections for moving the crusher holder rectilinearly in a plane transverse of the grinding wheel axis to bring the second crusher into operative engagement with the grinding wheel to finish the trueing operation.

2. A grinding machine having a frame and a grinding wheel rotatably mounted thereon, a pair of rotatable crushers, a holder [for] *carrying* said crushers, means supporting said holder for rectilinear movement towards the grinding wheel, means supporting said holder for rectilinear movement in a direction substantially transverse to the first direction, said two means comprising a slide on the frame slidably supporting said holder, means providing for yielding movement of the holder with respect to the grinding wheel and means for operating said holder on said slide to disengage one of the crushers and cause the engagement of the second crusher with the grinding wheel.

3. A grinding machine having a frame and a grinding wheel rotatably mounted thereon, a crusher holder, rotatable crushing means on said holder for trueing the surface of the grinding wheel, means supporting said holder on said frame for movement in a plurality of directions substantially transverse of one another, and *power operated* means *operatively connected to said holder* for moving said holder sequentially first in one direction at a controlled rate to cause approach of the axes of the grinding wheel and the crushing means, and then in a second direction substantially transverse of said one direction to gradually change the distance between the axes of the grinding wheel and the crushing means.

4. A grinding machine having a frame and a grinding wheel rotatably mounted thereon, a pair of rotatable crushers, a crusher holder *carrying said crushers,* slide means slideably supporting said holder for movement in one direction in a plane transverse of the grinding wheel axis, means slideably supporting said slide means for movement in a second direction in a plane transverse of the grinding wheel axis and at a substantial angle to said first direction, an adjusting motor carried by one of said means, drive mechanism operably connected to said motor for adjusting the slide means and adjusting the holder on the slide means to vary the distance between the axes of the crushers with respect to the grinding wheel axis, and clutch means controlling said drive mechanism.

5. A grinding machine having a frame and a grinding wheel rotatably mounted thereon, a roughing crusher operable to form the surface of the grinding wheel to the approximate shape desired, a finishing crusher for accurately finishing the wheel after the roughing crusher has been applied to the wheel, a common holder on which said crushers are rotatably mounted, means providing for yielding movement of said holder with respect to the grinding wheel, and means comprising mechanical adjusting devices and electrical control switches operable in conjunction therewith for controlling said holder to sequentially move the roughing crusher into yielding pressure engagement with the wheel, then positively move the roughing crusher towards the grinding wheel axis, then move the finishing crusher into yielding pressure engagement with the wheel and then positively move the finishing crusher towards the grinding wheel axis.

6. A crusher mechanism adapted to be used to form a grinding wheel comprising a pair of rotatable crushers, a holder [for] *carrying* said crushers and slide means slidably supporting said holder for movement in a plane transverse of the crusher axes in one direction generally towards the grinding wheel axis and in a second direction substantially transverse of said one direction, an adjusting motor carried by said slide means, drive mechanism operably connected to said motor for adjusting the slide means and the holder on the slide means, and clutch means controlling said drive mechanism to sequentially move one of the crushers into crushing engagement with the grinding wheel and then move said crusher out of engagement with the grinding wheel and bring the other crusher into crushing engagement with the grinding wheel.

7. A crusher mechanism adapted to be used to form a grinding wheel comprising a pair of rotatable crushers, a holder for said crushers and slide means slidably supporting said holder for movement in a plane transverse of the crusher axes in one direction, generally towards the grinding wheel axis and in a second direction substantially transverse of said one direction, an adjusting motor carried by said slide means, drive mechanism operably connected to said motor for adjusting the slide means and the holder on the slide means, means for yieldingly urging the holder towards the grinding wheel axis and lock means periodically operable to overcome the action of said urging means.

*8. A grinding machine having a frame and a grinding wheel rotatably mounted thereon, a crusher holder, rotatable crushing means on said holder for truing the surface of the grinding wheel, means supporting said holder on said frame for movement in a plurality of directions substantially transverse of one another, and power operated means operatively connected to said holder for moving said holder sequentially first in one direction at a controlled rate to cause*

*approach of the axes of the grinding wheel and the crushing means, and then in a second direction substantially transverse of said one direction to gradually change the distance between the axes of the grinding wheel and the crushing means, and control means operatively associated with said power operated means and said holder to automatically initiate the movement in the second direction following completion of the holder movement in the first direction.*

*9. A grinding machine having a frame and a grinding wheel rotatably mounted thereon, a crusher holder, rotatable crushing means on said holder for truing the surface of the grinding wheel, slide means supporting said holder on said frame for rectilinear movement in a plurality of directions substantially transverse of one another, power operated means operatively connected to said holder for moving said holder sequentially first in one direction at a controlled rate to cause approach of the axes of the grinding wheel and the crushing means, and then in a second direction substantially transverse of said one direction to gradually change the distance between the axes of the grinding wheel and the crushing means, and control means operatively associated with said power operated means and said holder to automatically initiate the movement in the second direction following completion of the holder movement in the first direction.*

*10. A grinding machine having a frame and a grinding wheel rotatably mounted thereon, a work supporting table, means supporting said table in said frame for reciprocatory movement past said grinding wheel, a crusher holder, rotatable crushing means on said holder for truing the surface of the grinding wheel, means supporting said holder on said table for movement relative thereto in a plurality of directions substantially transverse of one another, and means for moving said holder relative to said table sequentially first in one direction at a controlled rate to cause approach of the axes of the grinding wheel and the crushing means, and then in a second direction substantially transverse of said one direction to gradually change the distance between the axes of the grinding wheel and the crushing means.*

*11. A grinding machine having a frame and a grinding wheel rotatably mounted thereon, a work supporting table, means supporting said table in said frame for reciprocatory movement past said grinding wheel, a crusher holder, rotatable crushing means on said holder for truing the surface of the grinding wheel, means supporting said holder on said table for movement relative thereto in a plurality of directions substantially transverse of one another, power operated means operatively connected to said holder for moving said holder relative to said table sequentially first in one direction at a controlled rate to cause approach of the axes of the grinding wheel and the crushing means, and then in a second direction substantially transverse of said one direction to gradually change the distance between the axes of the grinding wheel and the crushing means, and control means operatively associated with said power operated means and said holder to automatically initiate the movement in the second direction following completion of the holder movement in the first direction.*

*12. A grinding machine having a frame and a grinding wheel rotatably mounted thereon, means for rotating said grinding wheel at grinding speed, a work supporting table, means supporting said table in said frame for reciprocatory movement past said grinding wheel, a crusher holder, rotatable crushing means on said holder for truing the surface of the grinding wheel, means supporting said holder on said table for movement relative thereto in a plurality of directions substantially transverse of one another, power operated means operatively connected to said holder for moving said holder relative to said table sequentially first in one direction at a controlled rate to cause approach of the axes of the grinding wheel and the crushing means, and then in a second direction substantially transverse of said one direction to gradually change the distance between the axes of the grinding wheel and the crushing means, control means operatively associated with said power operated means and said holder to automatically initiate the movement in the second direction following completion of the holder movement in the first direction, drive means for relatively rotating said grinding wheel and said crushing means at a comparatively slow crushing speed, and means connected to said drive means and operatively associated with said holder to automatically energize said drive means following a predetermined holder movement in the first direction.*

*13. A grinding machine having a frame and a grinding wheel rotatably mounted thereon, a crusher holder, rotatable crushing means on said holder for truing the surface of the grinding wheel, slide means supporting said holder on said frame for rectilinear movement in a plurality of directions substantially transverse of one another, power operated means operatively connected to said holder for moving said holder sequentially first in one direction at a controlled rate to cause approach of the axes of the grinding wheel and the crushing means, means cooperating with said crusher holder providing for yieldable contact of the grinding wheel and the crushing means upon the holder movement in the first direction, said power operated means including means for then positively moving the crusher holder in a second direction substantially transverse of said one direction to gradually change the distance between the axes of the grinding wheel and the crushing means, and control means operatively associated with said power operated means and said holder to automatically initiate the movement in the second direction following completion of the holder movement in the first direction.*

*14. A grinding machine having a frame and a grinding wheel rotatably mounted thereon, a work supporting table, means supporting said table in said frame for reciprocatory movement past said grinding wheel, a crusher holder, rotatable crushing means on said holder for truing the surface of the grinding wheel, means carrying said holder on said table for movement in vertical and horizontal directions relative thereto comprising a base portion fixed to said table, a support means carried in said base portion for horizontal sliding movements relative thereto, means in said support means carrying said crusher holder for vertical sliding in said support means, power operated means operatively connected to said holder for moving said holder sequentially first in one of said directions at a controlled rate to cause approach of the axes of the grinding wheel and the crushing means, and then in the other direction to gradually change the distance*

*between the axes of the grinding wheel and the crushing means, and control means including limit switch means operatively associated with said power means to automatically initiate the movement in the second direction following completion of the holder movement in the first direction.*

LOUIS F. POLK.

References Cited in the file of this patent or the original patent

UNITED STATES PATENTS

| Number | Name | Date |
|---|---|---|
| Re. 19,998 | Fletcher | June 9, 1936 |
| 553,393 | Charrier | Jan. 21, 1896 |
| 1,800,991 | Forst | Apr. 14, 1931 |
| 1,879,436 | Oberhoffken | Sept. 27, 1932 |
| 2,092,895 | Stevens | Sept. 14, 1937 |

FOREIGN PATENTS

| Number | Country | Date |
|---|---|---|
| 46,791 | Australia | Mar. 10, 1911 |
| 465,869 | Great Britain | May 18, 1937 |